United States Patent Office 3,825,610
Patented July 23, 1974

3,825,610
SELECTIVE HYDROGENATION OF
NAPHTHALENES
Ryuichi Sonoda and Tadayuki Ohmae, Niihama, Japan, assignors to Sumitomo Chemical Company, Ltd., Osaka, Japan
No Drawing. Filed June 19, 1972, Ser. No. 264,086
Claims priority, application Japan, June 19, 1971, 46/44,098
Int. Cl. C07c 5/10
U.S. Cl. 260—667       5 Claims

ABSTRACT OF THE DISCLOSURE

An improved process for the selective hydrogenation of alkylnaphthalenes or naphthalene to alkyltetrahydronaphthalene or tetrahydronaphthalene comprising using a fixed bed of a hydrodesulfurization catalyst, and an organic compound as a diluent which is quite soluble in the alkylnaphthalenes and naphthalene and is volatile under the hydrogenation reaction conditions is disclosed.

BACKGROUND OF THE INVENTION

1. Field of the Invention

This invention relates to a process for selectively hydrogenating alkylnaphthalenes or naphthalene to alkyltetrahydronaphthalene or tetrahydronaphthalene respectively.

2. Description of the Prior Art

Tetrahydronaphthalene is obtained by partially hydrogenating naphthalene. Due to the high boiling point and solubility of tetrahydronaphthalene, it has many uses in wide fields of application, for example, in dissolving various paints and varnishes, defatting in textiles, cleaning printing ink stains and the like, and thus the demand for tetrahydronaphthalene is potentially very high. However, no industrial processes for its production which are economically satisfactory are known.

As is described in the literature, for example, in C. G. Frye, A. W. Weitkamp, Journal of Chemical and Engineering Data, 14, No. 3, p. 372 (1969), Ando, S., et al., Coal Tar (Japan) 15, No. 9, p. 25 (1963), the hydrogenation reaction of naphthalene to tetrahydronaphthalene is extremely exothermic with an exothermic heat of as high as 250 Kcal./kg. and thus selectivity to tetrahydronaphthalene decreases with increasing reaction temperatures. Especially, the by-production of Decalin in the hydrogenation reaction of naphthalene increases sharply at a reaction temperature of above 300° C.

It is necessary therefore, to attain better selectivity to tetrahydronaphthalene with a high reaction velocity and a high conversion of naphthalene, to avoid a sudden increase in the temperature due to the heat of reaction and to control the reaction temperature in the appropriate range. In an attempt to achieve such purposes, two typical processes were proposed: one is disclosed in U.S. Pat. No. 2,481,921, wherein a fluidized catalyst bed system is employed and the heat of reaction is removed as the sensible heat of the catalyst slurry; and the other is disclosed in U.S. Pat. No. 3,541,169, wherein a plurality of adiabatic, fixed bed reactors are serially connected to effect a stepwise conversion and the reaction temperature is controlled within a narrow range by repeatedly conducting the reaction and cooling procedures. These processes are superior in operation to the prior art batchwise liquid phase reaction processes, in that they involve vapor phase reactions. They require, however, complicated equipment and a high installation cost.

Furthermore, since the prior art processes for producing tetrahydronaphthalene involve the use of a catalyst readily poisoned by sulfur content in the naphthalene feed, for example, a nickel or a platinum catalyst, it is necessary to remove any sulfur-containing impurities from the naphthalene raw material. These catalysts are active even at temperatures as low as about 200° C. and thus are preferred from the standpoint of high selectivity to tetrahydronaphthalene. They are, however, uneconomical in that they may be applied only with difficulty to the hydrogenation of naphthalene derived from coal tar and that a desulfurization treatment of the feed is required prior to the hydrogenation reaction even if naphthalene with a low sulfur content derived from petroleum is used.

Thus, for example, in the above-cited U.S. Patent No. 2,481,921, a method is employed in which the consumed catalyst is withdrawn continuously in the form of nickel sulfide with a supplementation of fresh nickel oxide catalyst, and in the above-cited U.S. Pat. 3,541,169, a method is employed in which a desulfurization treatment is carried out using a copper oxide catalyst. In either case, even the regeneration of the catalyst is complicated and cumbersome in operation.

SUMMARY OF THE INVENTION

In accordance with the present invention, the above enumerated two major disadvantages of the prior art processes are overcome. Thus the present invention provides a process for preparing alkyltetrahydronaphthalene or tetrahydronaphthalene quite economically from alkylnaphthalenes or naphthalene. More specifically this invention provides a process for the preparation of alkyltetrahydronaphthalene and tetrahydronaphthalene by diluting the alkylnaphthalenes or naphthalene with a diluent and passing the diluted alkylnaphthalenes or naphthalene in a gas-liquid mixed phase through a reaction vessel with a fixed catalyst bed filled with a hydrodesulfurization catalyst.

DETAILED DESCRIPTION OF THE INVENTION

The diluent employed in accordance with the present invention, can be any of those organic compounds with quite a good solubility in the alkylnaphthalenes and naphthalene which are predominantly in the liquid state at the minimum reaction temperature and predominantly in the gaseous state at the maximum reaction temperature, i.e., which are volatile at the hydrogenation reaction conditions. The purpose of using such solvents or diluents is to moderate any temperature elevation due to the heat of reaction by taking advantage of the latent heat of vaporization of the solvent or diluent. Where the temperature and pressure conditions for reaction are within the range of 250 to 330° C. and 30 to 60 kg./cm.$^2$, respectively, it is desirable, in view of these temperatures and pressures being most appropriate for tetrahydronaphthalene or alkyltetrahydronaphthalene production, to use one or more aromatic hydrocarbons of from 6 to 9 carbon atoms such as benzene, toluene, xylenes, ethylbenzene, and ethyltoluenes. It will be appreciated that a further advantage of using such solvents is that, due to the great difference between their boiling points and the boiling point of tetrahydronaphthalene, they can be quite easily separated by a conventional distillation subsequent to the reaction, recovered and recycled.

The hydrodesulfurization catalysts employed in this invention are those hydrodesulfurization catalysts which are suitable for various petroleum fractions such as naphtha, kerosene and heavy oil, fractions of catalytic cracked oil and those of thermally cracked oil. As is well known the catalysts of the type above-described have been extensively developed recently in connection with the solution of air pollution problems, one of the serious public nuisances now encountered, and with quality control over petroleum fuels. The catalysts may be the oxides of the Group VIII metals such as iron, cobalt and nickel or of the Group VI metals such as molybdenum and tungsten, or mixtures thereof, supported in any case on alumina or silica-alumina. These catalysts may be used mostly after conventional pretreatment to sulfurize the catalysts before use with hydrogen sulfide or an organic sulfur compound (see Journal of T. Shiba, Japan Petroleum Institute Vol. 5, p. 458 (1962)).

The naphthalene feed which can be used in the invention includes, in addition to those naphthalenes obtained from the dealkylation of catalytically reformed or cracked oil and separated from the oil products of the naphtha or crude oil cracking, naphthalene derived from coal tar with a high sulfur content. However, where the naphthalene to be used is contaminated by impurities having approximately the boiling point of tetrahydronaphthalene such as 4-methylindane (b.p. 202° C.), 5-methylindane (b.p. 205° C.) and 1,2,3,4-tetramethylbenzene (b.p. 205° C.), it is desirable to remove such impurities beforehand using any convenient method, as for example by distillation.

Furthermore, in the process in accordance with the invention, the solvent as the diluent and unreacted naphthalene can be recovered by distillation subsequent to the hydrogenation reaction and cycled for reuse, so that the conversion of naphthalene may not necessarily be near 100%, it being rather desirable to select suitable reaction conditions such as pressures, temperatures, hydrogen flow, liquid space velocity, concentrations of the naphthalene feed and the kind of the solvents to give rise to a conversion as high as possible and a selectivity to tetrahydronaphthalene of 95% or more.

As noted in the foregoing, the process according to the present invention may be applied, in addition to the preparation of tetrahydronaphthalene from naphthalene, to the selective hydrogenation of alkylnaphthalenes to alkyltetrahydronaphthalene, for example, the hydrogenation of methyl naphthalenes and dimethylnaphthalenes to methyl Tetralins and dimethyl Tetralins, respectively. In such applications, all of the above-mentioned characteristics and advantages in the selective hydrogenation of naphthalene to tetrahydronaphthalene also can be achieved.

The following examples are illustrative of preferred embodiments of the invention with comparison examples shown at the same time. It will be understood that these examples are given for the purposes of illustration and the present invention is not to be interpreted as limited to these examples.

In these examples of preferred embodiments of the invention and the comparison examples, the respective runs were carried out using a continuous hydrogenation apparatus comprising a stainless steel reaction vessel which can be externally electrically heated and has an inner diameter of 35 mm. and a length of 1,500 mm., a gas-liquid separator having an inner diameter of 50 mm. and a length of 1,000 mm., a plunger pump, a hydrogen bomb and a pressure controlling valve. The reaction vessel was partitioned into two zones, i.e. a preheating zone with a capacity of 230 ml. having been filled with glass beads of 3 to 5 mm. in size and a reaction zone with a capacity of 1,000 ml. located below the heating zone and filled with a catalyst. The reaction temperatures at various parts of the catalyst bed were measured using five sets of thermocouples and regulated using an external heater divided into five sections. The alkylnaphthalenes or naphthalene was the starting material and hydrogen feeding was made on a down-flow system through the reactor.

Examples 1 to 8

The reaction vessel was filled with 1,000 ml. of a hydrodesulfurization catalyst (Nippon Ketjenfine Co., Ltd.: 124–1.5 E; GC-4–1.5 E; or 153–3E-grade), and hydrogen sulfide and hydrogen were charged and compressed to a hydrogen sulfide partial pressure of 1 kg./cm.$^2$, a hydrogen partial pressure of 14 kg./cm.$^2$ and a total pressure of 15 kg./cm.$^2$ at room temperature. Thereafter the temperature was raised to 250° C. and held at this temperature for three hours to carry out the sulfurization pretreatment of the catalyst. The various physical and chemical properties of these catalysts are shown in Table I.

TABLE I

| | Catalyst | | |
|---|---|---|---|
| | 124–1.5E | GC–4–1.5E | 153–3E |
| Physical properties: | | | |
| Diameter (mm.) | 1.5 | 1.6 | 2.5 |
| Mean length (mm.) | 4.0 | 4.0 | 5.0 |
| Apparent density (kg./l.) | 0.75 | 0.70 | 0.67 |
| Chemical composition (wt. percent): | | | |
| CoO | 4.0 | 1.5 | 0 |
| MoO$_3$ | 12.0 | 16.5 | 15.0 |
| NiO | 0 | 3.0 | 3.0 |
| SiO$_2$ | 1.0 | 1.0 | 1.1 |
| Na$_2$O | 0.06 | 0.06 | 0.07 |
| Fe | 0.06 | 0.02 | 0.04 |
| SO$_4$ | 2.0 | 2.0 | 2.0 |
| Al$_2$O$_3$ | Balance | Balance | Balance |

The unreacted hydrogen sulfide was discharged and the atmosphere in the reaction vessel thoroughly replaced with hydrogen, whereafter a commercial grade of naphthalene derived from coal tar having the characteristics shown in Table II was hydrogenated under the various conditions as specified in Table III to give tetrahydronaphthalene in high conversion and high selectivity. Toluene which was of 99.9% or more purity and xylene which was a mixture consisting of 43% of ethylbenzene, 14% of para-xylene, 31% of meta-xylene and 12% of ortho-xylene were used as the diluent. Each diluent had a sulfur content of 0.1 p.p.m. or less.

Furthermore, the hydrogenated solutions obtained in Examples 1 to 3 were admixed together and the xylene was removed therefrom using a simple distillation. The residue was then subjected to rectification at a reflux ratio of 10 using a rectification column having 25 theroetical plates and filled with MaMahon packing to collect Tetralin of a purity of 98.9% as a fraction boiling at 205 to 207° C.

TABLE II

| | Pure naphthalene [1] | Crude naphthalene [2] | Analysis method |
|---|---|---|---|
| Composition (percent): | | | |
| Naphthalene | 98.7 | 96.6 | Gas-chromatography on PEG column. |
| Thionaphthenes and others | 1.3 | 3.4 | |
| Solidifying point (° C.) | 79.8 | 78.5 | |
| Sulfuric acid staining | 3(−) | 3(+) | JIS K 2421 |
| Moisture (percent) | 0.013 | 0.023 | Karl Fischer method. |
| Non-volatiles (percent) | 0.01 | 0.04 | JIS K 2421 |
| Total sulfur content (percent) | 0.20 | 0.66 | Wickbold method. |

[1] Made by Nisshin Kasei Co., Ltd.
[2] Made by Sumitomo Metal Ind. Co., Ltd.

TABLE III

| | Example Nos. | | | | | | | |
|---|---|---|---|---|---|---|---|---|
| | 1 | 2 | 3 | 4 | 5 | 6 | 7 | 8 |
| Solution feed: | | | | | | | | |
| Naphthalene feed [1] | A | A | B | A | A | B | A | B |
| Diluent [2] | X | X | X | X | T | X | T | T |
| Naphthalene concentration (in wt. percent) | 20 | 25 | 20 | 20 | 20 | 20 | 25 | 25 |
| Sulfur content in the solution feed (in p.p.m.) | 470 | 490 | 960 | 480 | 470 | 510 | 490 | 1,050 |

TABLE III—Continued

| | Example Nos. | | | | | | | |
|---|---|---|---|---|---|---|---|---|
| | 1 | 2 | 3 | 4 | 5 | 6 | 7 | 8 |
| Reaction conditions: | | | | | | | | |
| Catalyst [3] | a | a | a | b | b | b | c | c |
| Reaction temperature (in °C.): | | | | | | | | |
| Maximum temperature | 300 | 312 | 301 | 305 | 306 | 299 | 314 | 317 |
| Minimum temperature | 293 | 300 | 293 | 295 | 294 | 288 | 299 | 303 |
| Reaction pressure (in kg./cm.$^2$) | 49 | 50 | 49 | 49 | 50 | 50 | 48 | 50 |
| Liquid space velocity (in l./l./hr.) | 1.5 | 2.1 | 1.5 | 1.5 | 1.5 | 1.5 | 2.3 | 2.1 |
| Outlet hydrogen flow (in Nl/hr.) | 210 | 230 | 210 | 230 | 230 | 210 | 210 | 230 |
| Results: [4] | | | | | | | | |
| Naphthalene conversion (in percent) | 92.5 | 91.9 | 92.8 | 97.7 | 95.5 | 90.6 | 93.1 | 89.4 |
| Selectivity to tegrahydronaphthalene (in percent) | 94.0 | 97.1 | 93.6 | 96.9 | 97.3 | 98.4 | 95.5 | 98.2 |
| Selectivity to transDecalin (in percent) | 4.2 | 2.2 | 4.4 | 2.6 | 2.3 | 1.2 | 3.8 | 1.4 |
| Selectivity to cisDecalin (in percent) | 1.8 | 0.7 | 2.0 | 0.5 | 0.4 | 0.4 | 0.7 | 0.4 |
| Sulfur content in the resulting solution (in p.p.m.) | 40 | 43 | 320 | 27 | 29 | 31 | 22 | 290 |

[1] Naphthalene feed:
  A: Pure naphthalene produced by Nisshin-Kasei Co., Ltd.
  B: Crude naphthalene produced by Sumitomo Metal Ind. Co., Ltd.
[2] Diluent:
  X: Xylene.
  T: Toluene.
[3] Catalyst (prepared by Nippon Ketjenfine Co., Ltd.):
  a: 124–1.5E.
  b: GC–4–1.5E.
  c: 153–3E.
[4] Results—See table.

Product composition was analyzed by chromatography under the following conditions: Apiezon–L column of 3 m. in length; column temperature 165° C.; and 70 ml./sec. of helium as carrier gas.

Comparison Example 1

A 20 wt. percent naphthalene solution prepared by dissolving pure naphthalene in a commercial grade of tetrahydronaphthalene (purity 98.2%) was fed under the same catalyst, pressure, liquid space velocity, outlet hydrogen flow conditions as were used in Example 1 and the entrance portion of the catalyst bed raised to a temperature of 280° C., whereupon a large amount of exothermic heat was generated with the temperatures at various parts of the catalyst bed suddenly rising to as high as 350° C. or higher. Thus the reaction temperature went out of control, thereby rendering the reaction dangerous.

Comparison Example 2

The 20 wt. percent naphthalene solution as used in Comparison Example 1 was fed under the same catalyst, pressure, liquid space velocity, outlet hydrogen flow conditions as were used in Example 5 and the entrance portion of the catalyst bed raised to a temperature of 270° C., whereupon, as in Comparison Example 1, the reaction temperature went out of control due to an excessive generation of exothermic heat. Moreover, the catalyst was partially disintegrated and black solids precipitated in the withdrawn reaction solution.

EXAMPLE 9

A naphthalene feed stock (purity of 98.2%; total sulfur content of 4 p.p.m.) obtained through separation and purification of heavy oil by-produced in a naphtha cracking ethylene plant was dissolved in xylene to prepare a 20 wt. percent naphthalene solution. The solution was fed under the same catalyst, pressure, liquid space velocity, outlet hydrogen flow conditions as were used in Example 1 and hydrogenated at a temperature between 290 and 296° C. The naphthalene conversion and selectivity to tetrahydronaphthalene were 96.1 and 93.5%, respectively.

Example 10

A 20 wt. percent commercial methylnaphthalene (31 wt. percent α-isomer and 49 wt. percent β-isomer; naphthalene content of 4 wt. percent; b.p. range of 232 to 253° C.; and total sulfur content 4430 p.p.m.) solution in xylene was hydrogenated at a temperature ranging from 285 to 297° C. under the same catalyst, pressure, liquid space velocity, outlet hydrogen flow conditions as used in Example 4. The sum of the conversion of the α- and β-methylnaphthalenes plus the naphthalene was 87% and the sum of the by-produced Decalin and methylDecalins was less than 2.5%.

What is claimed is:

1. In a process for selectively hydrogenating alkylnaphthalene or naphthalene to produce alkyl substituted tetrahydronaphthalene or tetrahydronaphthalene which comprises reacting alkylnaphthalene or naphthalene with hydrogen, the improvements which comprises diluting the alkylnaphthalene or naphthalene with a liquid solvent therefor selected from the group consisting of benzene, toluene, xylene, ethylbenzene and ethyltoluene; contacting the diluted alkylnaphthalene or naphthalene in the presence of hydrogen with a fixed bed hydrodesulfurization catalyst selected from the group consisting of an oxide of cobalt, nickel, molybdenum and tungsten at a temperature of from 250° C. to 330° C. under a pressure of from 30 to 60 kg./cm.$^2$ to thereby volatilize said solvent and controlling the heat of the reaction by the latent heat of vaporization of said solvent.

2. The process as claimed in claim 1, wherein said alkylnaphthalene or naphthalene has a high sulfur content.

3. The process as claimed in claim 1, wherein said catalyst is supported on alumina or silica-alumina.

4. The process as claimed in claim 1, wherein the process is carried out continuously.

5. The process as claimed in claim 1, wherein said catalyst is a sulfurized pretreated catalyst.

References Cited
UNITED STATES PATENTS

| 3,719,719 | 3/1973 | Amidon | 260—667 |
| 3,541,169 | 11/1970 | Hicks et al. | 260—667 |
| 3,449,452 | 6/1969 | Gatsis | 260—667 |

VERONICA O'KEEFE, Primary Examiner